Dec. 3, 1935.  W. C. BERRIEN  2,023,303
COMPUTING SCALE
Filed July 12, 1933  2 Sheets-Sheet 1

INVENTOR.
WALTER C. BERRIEN
BY
ATTORNEY

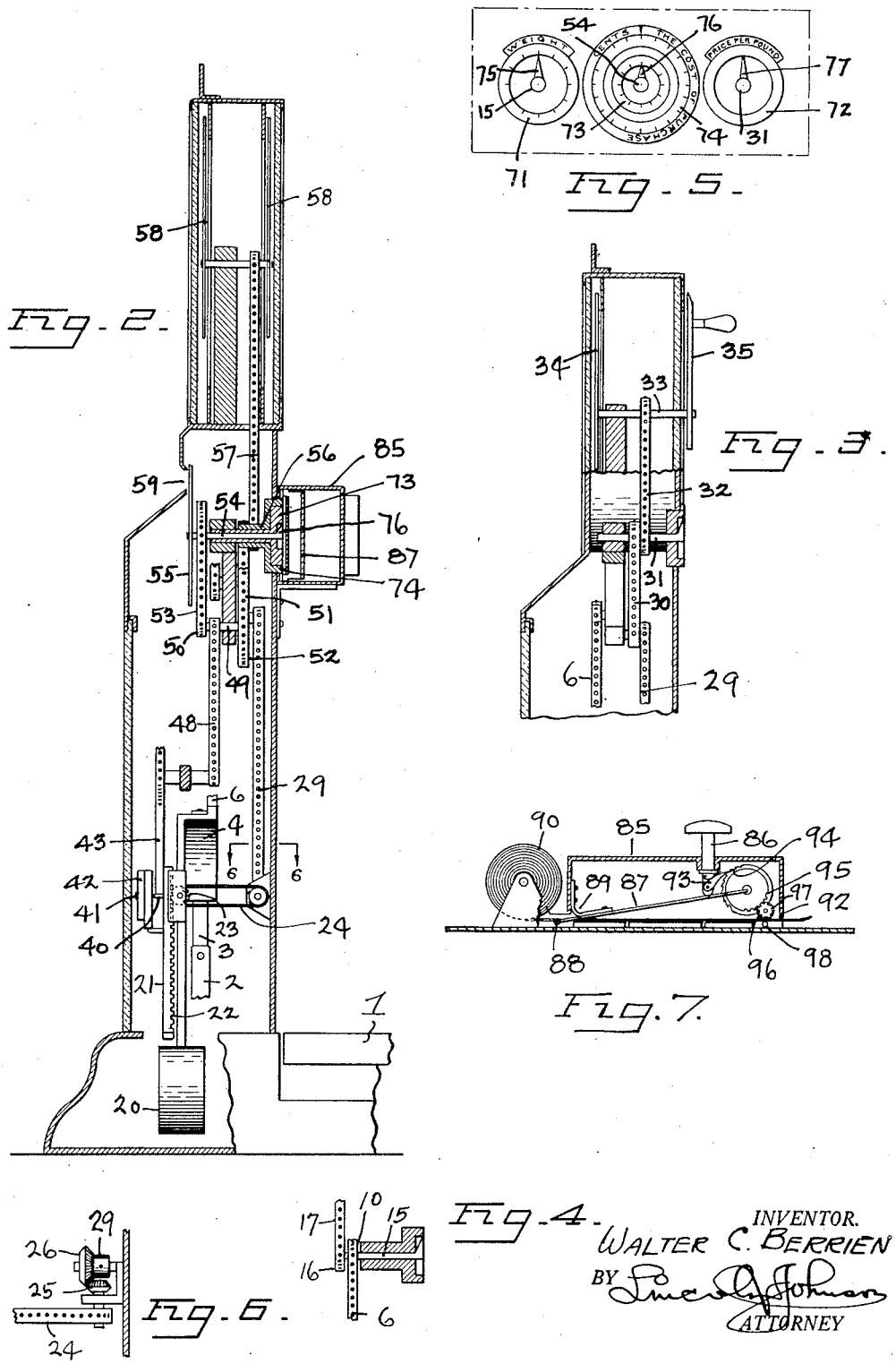

Patented Dec. 3, 1935

2,023,303

UNITED STATES PATENT OFFICE 2,023,303

COMPUTING SCALE

Walter C. Berrien, San Bruno, Calif., assignor of one-fourth to C. G. Mattox and one-fourth to A. B. Chapman, both of San Francisco, Calif.

Application July 12, 1933, Serial No. 680,075

9 Claims. (Cl. 265—37)

My invention relates to improvements in a computing scale, especially to those which are designed to automatically compute the cost of purchase.

An object of my invention is to provide a computing scale which upon being manually set in accordance with the price per pound, is adapted to indicate the cost of purchase.

Another object of my invention is to provide means adapted to register every sale as to its weight, price per pound, and the total cost of purchase.

Still another object of my invention is to provide a number of embossed dials operatively connected with the weight, price per pound, and cost of purchase indicating means, and a printing means adapted to reproduce the facsimile of said dials.

Other objects and advantages of the invention will appear as the specification proceeds, and the novel features will be particularly pointed out in the appended claims.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In broad terms my invention relates to a weighing machine on which a weighing platform is operatively connected to a pendulum and a weight indicating means. A price per pound indicating means, adapted to be manually set according to the given price per pound, is operatively connected with a compensating beam, slidably carried by a pendulum. The cost of purchase indicating means is connected with said compensating beam and registers the combined movement thereof resulting from the swinging of the pendulum under the weight of the article and movement of the beam, set according to the given price, thus automatically computing the cost of purchase. Three dials are operatively connected with the above described indicating means, in conjunction with a manually operated printing mechanism, to furnish a printed record of the same.

The preferred form of my invention is illustrated in the accompanying drawings in which:

Fig. 2 is a vertical cross-section of the device taken along the line 2—2 of Fig. 1.

Fig. 3 is a vertical cross-section of the device taken along the line 3—3 of Fig. 1.

Fig. 4 is a vertical cross-section of the weight printing dial.

Fig. 5 is a front elevation of the printing dials.

Fig. 6 is a section along the line 6—6 of Fig. 2.

Fig. 7 is a horizontal cross-section of the printing mechanism.

Figure 1:
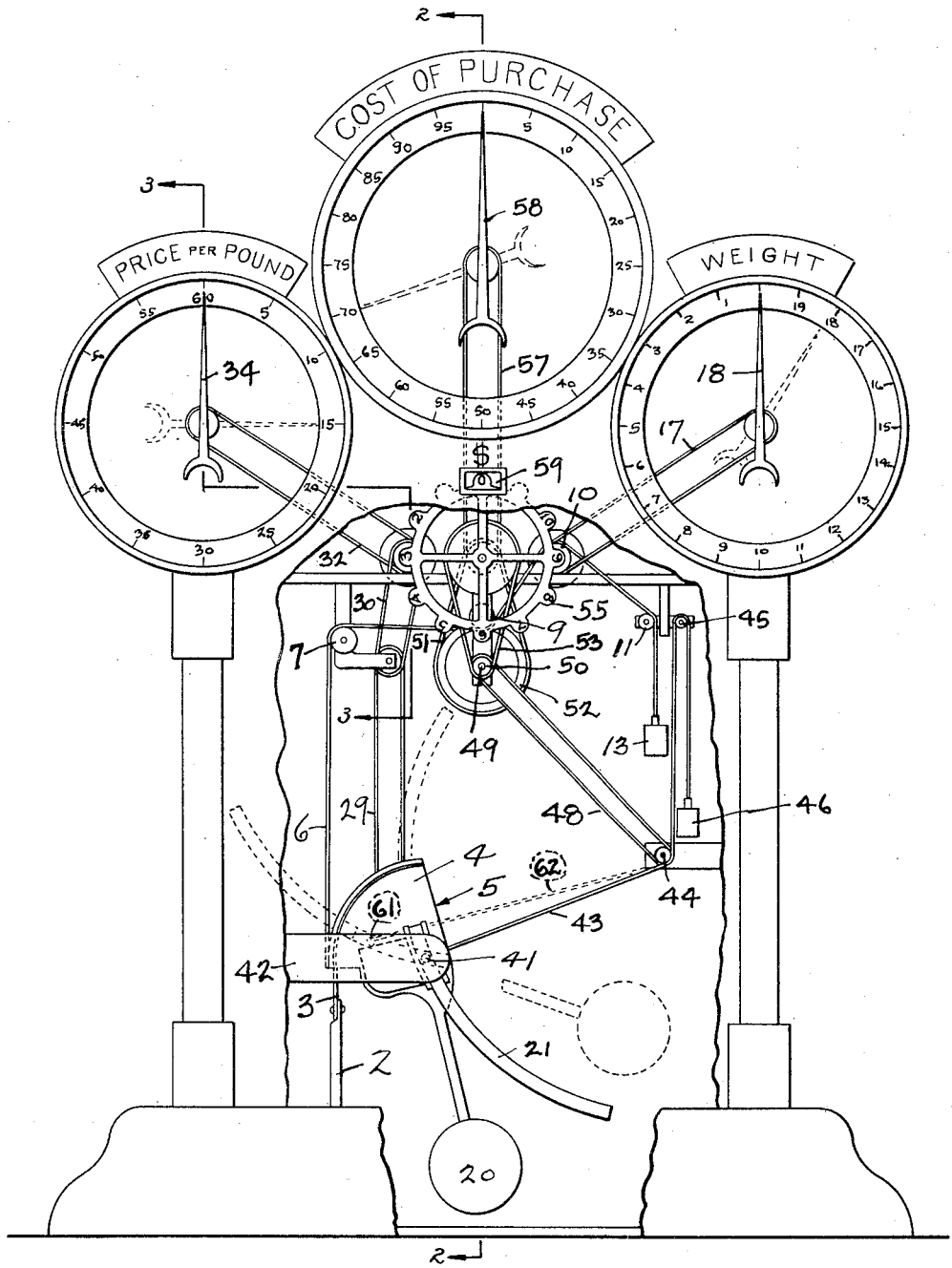
Fig. 1 is a front elevation of a weighing machine constructed in accordance with my invention, partly broken away to disclose the inner mechanism.

A weighing machine of my design has a usual platform 1, operatively connected by means of a stirrup 2 and a flexible steel tape 3, to the pendulum segment 4 of the pendulum 5, mounted on a fulcrum pivot 41.

Downward movement of the platform 1 under the weight of an article, pulls the stirrup 2 downwardly and swings the pendulum 5 in counter-clockwise direction.

A flexible perforated steel tape 6 with one end fastened to the pendulum segment 4 passes around rollers 7 and 9, a sprocket wheel 10, a roller 11, and carries a weight 13 on its other end. The sprocket wheel 10 is keyed to the shaft 15 (see Fig. 4), to which shaft a sprocket wheel 16 is also keyed. The latter carries a tape 17 which operates the weight indicator 18. From the foregoing description, it is evident that every downward movement of the platform 2 will be indicated by the indicator 18.

The pendulum 5, in addition to ordinary weight 20, slidably carries a compensating beam 21 of the shape clearly shown in Fig. 1. A gear rack 22 is provided thereon, meshing with a sprocket 23 operated by the tape 24, which by means of the gears 25 and 26 (see Fig. 6) is operatively connected with a tape 29. The latter by means of suitable shaft and gears is operatively connected with a tape 30 which is adapted to rotate a shaft 31, and by means of a tape 32, to rotate a shaft 33 in unison therewith. A price indicator 34 on the front side of the machine and a manually operated hand lever 35 on the rear of the machine, are fixedly attached to said shaft 33. From the foregoing description of the various parts of the mechanism it may be clearly seen that the movement of the hand lever 35 will be transmitted to the gear 23 and the latter will move the compensating beam 21 upwardly and downwardly, and the movements of the beam 21 will be a function of the movement of the hand lever 35.

The beam 21 rotatably carries a pin 40 normally located at the initial position of work, on the center line of the fulcrum pivot 41, by means of which the pendulum 5 is attached to the bracket 42. One end of a tape 43 is fastened to the pin 40, and said tape passes around the gear 44 and roller 45, and carries a weight 46 on its other end. The gear 44 is adapted to operate a tape 48, and the latter tape to operate a shaft 49, which fixedly carries a small gear 50 and a large gear 52. The movement of the gear 50 is transmitted by means of a tape 53 to a shaft 54 and to the "dollar" indicator 55. The movement of the gear 52 is transmitted by means of a tape 51 to a hollow shaft 56. A tape 57 connects the shaft 56 with the "cost of purchase" indicator 58. The ratio of the gears 50 and 52 is such that the indicator 55 will show the amount or the cost of purchase in dollars, and the indicator 58 in cents. I provide an opening 59 in the front of the machine for convenient reading by the purchaser of the amount of dollars shown by the indicator 55.

As shown in Fig. 1 the compensating beam 21 is curved, the center of the curvature being in the center of the gear 44. The upward movement of the beam 21, and the pin 40, does not affect the length of the tape from the pin 40 to the gear 44. The movement of the pendulum 5 under the weight of an article, if the price indicator is set on zero, does not affect said tape length on account of the central location of the pin 40. Any weight on the platform, when the price indicator is set at zero, shows the cost of purchase at zero, and hence any manual setting of the price indicator, without any weight on the platform or otherwise disturbing the pendulum 5, will register zero on the "cost of purchase" scale. Only the combined action of the weight of an article on the scale platform and the manual setting of the "price per pound" indicator will affect the "cost of purchase" indicator.

If it be supposed that an article weighing 18 pounds is on the platform 1, the pendulum 5 swings into a position indicated by dotted lines (Fig. 1), and the weight indicator stops in front of the dial numeral "18". Suppose the price per pound is 15 cents, and the lever 35 and, associated therewith, the indicator 34, are accordingly set. The pin 40 then moves to a position indicated by dotted lines at 61 and the tape 43 to a position indicated by dotted lines at 62. The distance between the pin 40 and the gear 44 is thus increased and this sets in motion the tapes 48, 53, 51 and 57, and the respective indicators 55 and 58 take new positions which represent the resultant of combined movement of the pendulum and the compensating beam. The scale used in connection with the "cost of purchase" indicators is chosen to satisfy the result of multiplication of given numbers of the weight and the cost per pound.

I use a number of perforated flexible steel tapes which insure positive and accurate movement of the parts, and in connection with sprocket wheels or gears impart a true rotation thereto with no loss of movement and very little friction.

In order to register a sale in detail, namely; the weight of the article, price per pound and the cost of purchase, I provide a mechanism (see Fig. 5), which consists of a "weight" dial 71, a "price per pound" dial 72, and "cost of purchase" dials 73 and 74, and hands 75, 76 and 77 which are integral with the shafts 15, 54 and 31 respectively. The dials 71, 72 and 73 are stationary, and the hands 75, 76 and 77 rotate in unison with the indicators 18, 55 and 34 respectively. As is shown in Fig. 2, the dial 74 is integral with the shaft 56 and moves in unison with the indicator 58. It is evident that the movements of the hands 75, 76 and 77 and the dial 74 are an exact repetition of the movements of the indicators 18, 58, 34 and 55 respectively.

A printing mechanism is located opposite the dials 71, 72 and 73 consisting of a frame 85, a plunger 86 slidably attached thereto, and a plate 87 hinged to the frame at 88. A spring 89 yieldingly holds the plate 87 against the plunger. A roll of paper 90 is carried by the frame and the paper is drawn in front of the dials 71, 72 and 73 as shown in Fig. 6. A strip of carbon paper is passed between the dials and the paper. Movement of the plunger 86 results in contacting the plate 87 against the dials and the hands, which are embossed so as to leave the imprint on the paper placed in front thereof. An exact record of a sale is thus made and the printed paper may be withdrawn and handed to a purchaser, or preserved as a record by the salesman.

After the record is printed, the salesman pulls the paper and tears the printed piece off, using the sharp edge 92 of the frame 85 as a knife. To facilitate the movement of the movement of the paper I provide a ratchet mechanism, which consists of a spring pressed pawl 93 carried by the plunger 86, and a ratchet wheel 94 which operates a gear 95, meshing with a gear 96, thus rotating a roller 97. The paper 90 is drawn between said roller 97 and the auxiliary pressure roller 98. The receding movement of the plunger 86 operates the ratchet mechanism and pulls a selected length of the paper out of the frame 85, where it may be readily grasped to be torn off.

Having thus described this invention, what I claim and desire to secure by Letters Patent is:

1. A computing scale having a platform, a pendulum operatively connected to said platform, means for indicating "weight" operated by said pendulum; a compensating beam slidably carried by the pendulum; a manually settable "price indicating means" to move the compensating beam; and "cost of purchase" indicating means operatively connected to said beam and adapted to be operated by the combined movements of the pendulum and the compensating beam.

2. A computing scale including a platform; a pendulum operatively connected to the platform; a compensating beam positioned on said pendulum; manual means to regulate the position of the beam on the pendulum; separate dials to indicate the "weight" and the "cost of purchase" of an article placed on the platform; said weight indicating dial being operated by means connected to and controlled by the pendulum, and said "cost of purchase" dial being operated by another means connected to and controlled by the combined movement of the pendulum and beam.

3. A computing scale including a platform; a pendulum operatively connected to the platform; means to maintain said pendulum in a position of rest a compensating beam adjustably positioned on said pendulum; means to change the position of the beam on the pendulum without moving the pendulum away from the position of rest; a dial to indicate the "cost of purchase" of an article placed on the platform; and means connecting said dial to the movable beam on the pendulum whereby the dial will indicate the "cost of purchase" in predetermined relation to the swing of the pendulum and beam away from the position of rest.

4. A computing scale including a platform; a pendulum operatively connected to the platform; means to maintain said pendulum in a position of rest; a compensating beam adjustably positioned on said pendulum; means to change the position of the beam on the pendulum without moving the pendulum away from the position of rest; a dial to indicate "price per pound" operatively connected to means for changing the position of the beam on the pendulum; a dial to indicate the "cost of purchase" of an article placed on the platform; and means connecting said latter dial to the movable beam on the pendulum whereby the latter dial will indicate the "cost of purchase" in predetermined relation to the swing of the pendulum and beam away from the position of rest.

5. A computing scale including a platform; a pendulum operatively connected to the platform; means to maintain said pendulum in a position of rest a compensating beam adjustably positioned on said pendulum; means to change the position of the beam on the pendulum without moving the pendulum away from the position of rest; a dial to indicate the "cost of purchase" of an article placed on the platform; means connecting said dial to the movable beam on the pendulum whereby the dial will indicate the "cost of purchase" in predetermined relation to the swing of the pendulum and beam away from the position of rest; and means to maintain said last mentioned means under tension at all times.

6. A computing scale including a platform; a pendulum operatively connected to the platform; means to maintain said pendulum in a position of rest a compensating beam adjustably positioned on said pendulum; means to change the position of the beam on the pendulum without moving the pendulum away from the position of rest; a dial to indicate the "cost of purchase" of an article placed on the platform; means connecting said dial to the movable beam on the pendulum whereby the dial will indicate the "cost of purchase" in predetermined relation to the swing of the pendulum away from the position of rest; a dial to indicate the "weight" of an article placed on the platform; and means connecting said last mentioned dial to the pendulum whereby said dial will indicate the "weight" of the article weighed in direct relation to the swing of the pendulum and beam away from the position of rest.

7. A computing scale, including a platform for holding an article to be weighed; a pivoted pendulum balanced to off-set the normal weight of the platform; a compensating beam adjustably mounted on said pendulum; means to change the location of the compensating beam on the pendulum in accordance with the "price per pound" of an article on the platform; a dial to indicate the "cost of purchase" of an article on the platform; and means connecting the compensating beam with the "cost of purchase" dial to register automatically on said dial the cost of purchase of the article on the platform as affected by the "price per pound" setting of the compensating beam, resulting from the swinging of the pendulum and beam under the weight of the article on the platform.

8. A computing scale, including a platform for holding an article to be weighed; a pivoted pendulum balanced to off-set the normal weight of the platform; a compensating beam adjustably mounted on said pendulum; means to change the location of the compensating beam on the pendulum in accordance with the "price per pound" of an article on the platform; a dial to indicate the "cost of purchase" of an article on the platform; means connecting the compensating beam with the "cost of purchase" dial to register automatically on said dial the cost of purchase of the article on the platform as affected by the "price per pound" setting of the compensating beam, resulting from the swinging of the pendulum and beam under the weight of the article on the platform; a dial to indicate the weight of an article on the platform; and means of connection between said last mentioned dial and the pendulum.

9. A computing scale, including a platform for holding an article to be weighed; a pivoted pendulum balanced to off-set the normal weight of the platform; a compensating beam adjustably mounted on said pendulum; a gear rack on said beam; a pinion on the pendulum meshing with the gear rack to reciprocate the beam; means to actuate the pinion and to move the rack and to change the location of the beam on the pendulum in accordance with the "price per pound" of an article on the platform; a dial to indicate the "cost of purchase" of an article on the platform; a differential connection between the beam and the "cost of purchase" dial to register automatically on said dial the cost of purchase of an article on the platform as affected by the "price per pound" setting of the compensating beam, resulting from the swinging of the pendulum and beam under the weight of an article on the platform.

WALTER C. BERRIEN.